(12) United States Patent
Koyama (10) Patent No.: US 6,750,319 B2
(45) Date of Patent: Jun. 15, 2004

(54) PROCESS FOR PRODUCING POLYARYLENE SULFIDE AND APPARATUS USED THEREIN

(75) Inventor: Yoshinari Koyama, Chiba (JP)

(73) Assignees: Idemitsu Petrochemical Co., Ltd., Tokyo (JP); Petroleum Energy Center, a Juridical Incorporated Foundation, Tokyo (JP)

(*) Notice: Subject to any disclaimer, the term of this patent is extended or adjusted under 35 U.S.C. 154(b) by 76 days.

(21) Appl. No.: 10/117,193

(22) Filed: Apr. 8, 2002

(65) Prior Publication Data

US 2002/0147299 A1 Oct. 10, 2002

(30) Foreign Application Priority Data

| Apr. 10, 2001 | (JP) | ........................... 2001-111113 |
| Apr. 10, 2001 | (JP) | ........................... 2001-111114 |
| Apr. 10, 2001 | (JP) | ........................... 2001-111115 |

(51) Int. Cl.$^7$ ........................... C08G 75/00; C08G 75/14
(52) U.S. Cl. ........................ 528/373; 528/480; 526/920
(58) Field of Search ................. 528/373, 480; 526/920

(56) References Cited

U.S. PATENT DOCUMENTS

| 5,635,587 A | 6/1997 | Koyama et al. |
| 5,856,433 A | 1/1999 | Koyama et al. |
| 5,898,061 A | 4/1999 | Sase et al. |

FOREIGN PATENT DOCUMENTS

| EP | 415258 | * | 3/1991 |
| EP | 861856 | * | 9/1998 |
| WO | 9717382 | * | 5/1997 |

* cited by examiner

*Primary Examiner*—Duc Truong
(74) *Attorney, Agent, or Firm*—Oblon, Spivak, McClelland, Maier & Neustadt, P.C.

(57) ABSTRACT

There are disclosed a process for producing a polyarylene sulfide through polymerization condensation of a sulfur source and a dihalogenated aromatic compound by using a polymerization vessel equipped with baffles that are asymmetrically arranged in the polymerization vessel or in the form of round bar, or by using a polymerization vessel equipped with an agitational blade which is devoid of a notch in the vicinity of the tip portion of the blade, and is in such a configuration as substantially equalizing the spacing between the tip portion thereof and the opposite bottom portion and/or end portion of the polymerization vessel all over the tip portion thereof; and an apparatus used for the process. The process and apparatus enables to form a uniform dispersion state of polymer phase in the vessel and to produce polyarylene sulfide having a high molecular weight.

14 Claims, 7 Drawing Sheets

PROCESS FOR PRODUCING POLYARYLENE SULFIDE AND APPARATUS USED THEREIN

BACKGROUND OF THE INVENTION

1. Field of the Invention

The present invention relates to a process for producing a polyarylene sulfide and an apparatus used in the process. More particularly, it pertains to a process capable of forming a uniformly dispersed state of a polymer phase in the case of separating a polymer phase from a solvent phase in producing a polyarylene sulfide, thus enabling production of a polyarylene sulfide having a high molecular weight; and an apparatus used in the process.

2. Description of the Related Arts

A polyarylene sulfide (hereinafter sometimes referred to as "PAS"), especially polyphenylene sulfide is known as an engineering plastic which is excellent in mechanical strength, heat resistance and the like, and which has good electrical characteristics and high rigidity. Thus it is widely employed as various materials such as electronic parts and electrical parts. A number of proposals have recently been put forward on a process wherein polymerization is conducted by using a phase separation agent as a process of producing a polyarylene sulfide having a high molecular weight. The foregoing process sometimes involves such problems as causing a state that a polymer phase is separated form a solvent phase in a polymerization vessel after polymerization reaction, and in this case the polymer phase is settled by the difference in the specific gravity therebetween in a vessel bottom portion which is difficult to be influenced by shearing force due to agitation, thereby causing remarkable variance in the compositional ratio of the polymer phase to the solvent phase depending upon the position in the polymerization vessel.

As such in order to obtain a PAS having a high molecular weight, it is usually necessary to maintain the compositional ratio of the polymer phase to the solvent phase at a constant level in the polymerization vessel. As one of methods, it is taken into consideration to effect the polymerization while agitating the contents in the vessel under such conditions as uniformizing the above-mentioned compositional ratio. On the other hand, there is disclosed a polymerization method in which specially shaped agitational blades are used {Japanese Patent Application Laid-Open No. 290375/2000 (Heisei 12)}.

However, even with the aforesaid method, the uniformity of the polymer phase dispersion state is still insufficient and besides, in an attempt to obtain a PAS having a high molecular weight, sufficient agitational state is not assured as the case may be. In such circumstances, it has been eagerly desired to develop a process capable of producing a PAS having a high molecular weight.

It is taken into consideration as another method, to take out the polymer phase together with the solvent phase from the vicinity of the central portion in the depth direction of the vessel, said portion being considered to be in an average agitational state. In addition, there is disclosed a method in which a pool portion is provided at the bottom of the vessel, the polymer phase is withdrawn therefrom, and the solvent phase is withdrawn from a solvent pool installed at the top of the vessel so that the foregoing compositional ratio is kept constant {Japanese Patent Application Laid-Open No. 169844/1997 (Heisei 9)}. However, even with the foregoing method, the uniformity of the polymer phase dispersion state is still insufficient. Hence, it has been desired to develop a method capable of further uniformizing the dispersion state and besides, accurately controlling the compositional ratio of the polymer phase to the solvent phase. Further, it has been desired to develop a method capable of producing PAS with convenient and simple equipment without setting up a special pool portion as disclosed in the Patent Application mentioned above.

SUMMARY OF THE INVENTION

The present invention has been made in the light of the subject as mentioned above. A general object thereof is to provide a process capable of forming a uniform dispersion state of the polymer phase in a PAS polymerization vessel and thus producing a PAS having a high molecular weight, and to provide a PAS production apparatus usable in the aforesaid process.

Another object of the present invention is to provide a process capable of forming a uniform dispersion state of the polymer phase in a PAS polymerization vessel and also accurately controlling the compositional ratio of the polymer phase to the solvent phase, and also to provide a PAS production apparatus capable of forming a uniform dispersion state of the polymer phase therein with convenient and simple equipment, and also accurately controlling the compositional ratio of the polymer phase to the solvent phase.

Other objects of the present invention will become obvious from the text of this specification hereinafter disclosed.

In view of the foregoing objects, intensive extensive research and investigation were accumulated by the present inventors. As a result, it has been found that the objects of the present invention can be achieved by using a polymerization vessel equipped with baffles having specific arrangement and specific configuration. Further, it has been found that the objects of the present invention can be achieved by using a polymerization vessel equipped with agitational blades having specific configuration and specific arrangement. The present invention has been accomplished on the basis of the foregoing findings and information.

Specifically, the present invention provides a process for producing a polyarylene sulfide by the use of a polymerization vessel equipped with baffles, characterized by using the baffles that are asymmetrically arranged in a polymerization vessel, and/or in the form of round bar, and also provides an apparatus to be used in the above-mentioned process (hereinafter referred to as the first aspect of the present invention).

In addition, the present invention provides a process for producing a polyarylene sulfide by using a polymerization vessel equipped with an agitational blade, characterized by using the agitation blade which is devoid of a notch in the vicinity of the tip portion thereof, and which is in such a form as substantially equalizing the spacing between the tip portion thereof and the opposite bottom portion and/or end portion of a polymerization vessel all over the aforesaid tip portion, and also provides an apparatus for producing a PAS by using a polymerization vessel equipped with an agitational blade, characterized by using the agitation blade which is devoid of a notch in the vicinity thereof, and which is in such a form as substantially equalizing the spacing between the tip portion thereof and the opposite bottom portion and/or end portion of a polymerization vessel all over the aforesaid tip portion (hereinafter referred to as the second aspect of the present invention).

Furthermore, it has been found by the present inventors that the objects of the present invention can be achieved by separating a PAS resulting from polymerization into the polymer phase and the solvent phase, and immediately thereafter taking out at least part of the polymer phase settled in the lower portion of the polymerization vessel so that the polymer phase is prevented from agglomerating. That is to say, the present invention provides a process for producing a polyarylene sulfide by effecting polymerization in a polymerization vessel and then separating the same into the polymer phase and the solvent phase, characterized by withdrawing the polymer phase through a withdrawing portion provided on the end plate of the aforesaid polymerization vessel, and also provides an apparatus for producing a polyarylene sulfide by the use of a polymerization vessel equipped with an agitational blade, characterized in that said apparatus is equipped with a withdrawing portion which is placed on the end plate of the above-mentioned polymerization vessel, and is protruded into the vessel by a protrusive length of 0 to 80% of the spacing between the tip portion of the agitational blade and the opposite bottom portion (hereinafter referred to as the third aspect of the present invention).

DESCRIPTION OF THE PREFERRED EMBODIMENTS

In the present invention, a polyarylene sulfide is produced by subjecting a sulfur source and a dihalogenated aromatic compound to polymerization condensation reaction in an organic solvent and at need in the presence of a phase separation agent. Examples of sulfur sources to be used in the process according to the present invention include an alkali metal sulfide, an alkali metal hydrosulfide, hydrogen sulfide, etc. Specific examples of the alkali metal sulfide include lithium sulfide, sodium sulfide, potassium sulfide, rubidium sulfide, cesium sulfide, etc., of which lithium sulfide and sodium sulfide are preferable, and lithium sulfide is particularly preferable. Any of the alkali metal sulfides may be used alone or in combination with at least one other species, and is selected for use from those that are obtained by the reaction of an alkali metal hydrosulfide and a base. There are also usable an alkali metal sulfide along with an alkali metal hydrosulfide and a base.

As a sulfur source, it is possible to use hydrogen sulfide in combination with a base, and to use an alkali metal sulfide and/or an alkali metal hydrosulfide in combination with hydrogen sulfide and a base. Specific examples of the alkali metal hydrosulfide include lithium hydrosulfide, sodium hydrosulfide, rubidium hydrosulfide, potassium hydrosulfide, cesium hydrosulfide, etc., of which lithium hydrosulfide and sodium hydrosulfide are preferable, and lithium hydrosulfide is particularly preferable. Any of the alkali metal hydrosulfides may be used alone or in combination with at least one other species.

A variety of species, whether an inorganic compound or an organic compound, are usable as a base, provided that each of the compounds is capable of converting the alkali metal hydrosulfide to the alkali metal sulfide, or capable of converting the hydrogen sulfide to the alkali metal hydrosulfide, or capable of efficiently neutralizing or receiving a hydrogen halogenide which is formed by the condensation reaction between the alkali metal hydrosulfide or hydrogen sulfide and the dihalogenated aromatic compound as described hereinafter, and provided that each thereof is an acid receptor which does not impair any of the objects of the present invention. Of these, an alkali metal hydroxide is preferably used. Specific examples of the alkali metal hydroxide include lithium hydroxide, sodium hydroxide, potassium hydroxide, rubidium hydroxide, cesium hydroxide, etc., of which lithium hydroxide and sodium hydroxide are preferable, and lithium hydroxide is especially preferable. As as salt of an organic compound, there are preferably usable a metal salt of a ω-hydroxycarboxylic acid, a metal salt of a aminocarboxylic acid, etc. Any of the bases may be used alone or in combination with at least one other species. It is usually sufficient when the proportion of the aforesaid base to be used is 0.08 to 1.2 mol, approximately per one mol of hydrogen atoms in the total sum of the foregoing alkali metal hydrosulfide and hydrogen sulfide. The aforesaid alkali metal sulfide and alkali metal hydrosulfide each being an industrial product and having water of hydration of 2.6 to 9 mol per one mol thereof may be used as such or after preliminary dehydration.

The aforesaid dihalogenated aromatic compound to be used in the process according to the present invention is exemplified by well known compounds that are employed for producing polyarylene sulfide. It is specifically exemplified by dihalobenzene such as p-dihalobenzene and m-dihalobenzene, alkyl-substituted dihalobenzene, cycloalkyl-substituted dihalobenzene and the like such as 2,3-dihalotoluene; 2,5-dihalotoluene; 2,6-dihalotoluene; 3,4-dihalotoluene; 2,5-dihaloxylene; 1-ethyl-2,5-dihalobenzene; 1,2,4,5-tetramethyl-3,6-dihalobenzene; 1-n-hexyl-2,5-dihalobenzene; and 1-cyclohexyl-2,5-dihalobenzene, aryl-substituted dihalobenzene such as 1-phenyl-2,5-dihalobenzene; 1-benzyl-2,5-dihalobenzene; and 1-p-toluyl-2,5-dihalobenzene, dihalobiphenyl such as 4,4'-dihalobiphenyl, dihalonaphthalene such as 1,4-dihalonaphthalene; 1,6-dihalonaphthalene; and 2,6-dihalonaphthalene, and the like.

The amount of the dihalogenated aromatic compound to be used therein, when not being incorporated with a branching agent as described hereinafter, is usually 0.90 to 1.30 mol, preferably 0.95 to 1.20 mol per one mol of sulfur atoms in the foregoing sulfur source. When a branching agent is incorporated therein, the total amount of the dihalogenated aromatic compound and the branching agent is usually 0.90 to 1.30 mol, preferably 0.95 to 1.20 mol per one mol of sulfur atoms.

Examples of the phase separation agent to be used in the present invention include halogenated lithium such as lithium chloride and lithium fluoride; alkali metal acetates such as lithium acetate and sodium acetate; alkali metal sulfonate such as lithium sulfonate and sodium sulfonate; water and the like. Of these are preferable the halogenated lithium, alkali metal acetates and water. The amount of the phase separation agent to be used therein needs only to be such amount as forming polymer phase without specific limitation, and is usually 0.05 to 2.0 mol, preferably 0.2 to 2.5 mol per one mol of sulfur atoms in the sulfur source. The amount of the phase separation agent, when being less than 0.5 mol, often leads to such disadvantages as insufficient effect of adding the same, low rate of reaction and incapability of achieving high molecular weight and high purity of a PAS to be produced, whereas the amount, when being more than 3.0 mol, is not economical because of incapability of exhibiting the working effect corresponding to the amount used and a production cost unreasonably increased thereby.

It is possible in the present invention to add, to the reaction system when necessary, a branching agent such as a halogenated aromatic compound containing active hydrogen, a polyhalogenated aromatic compound having at least three halogen atoms in one molecule and a halogenated aromatic nitro compound that are properly selected for use, along with the foregoing phase separation agent.

The halogenated aromatic compound containing active hydrogen is exemplified by halogenated aromatic compound which has a functional group bearing active hydrogen such as amino group, thiol group and hydroxyl group, etc. and is specifically exemplified by dihaloanilines such as 2,6-dichloroaniline, 2,5-dichloroaniline, 2,4-dichloroaniline and 2,3-dichloroaniline; trihaloanilines such as 2,3,4-trichloroaniline, 2,3,5-trichloroaniline, 2,4,6-trichloroaniline and 3,4,5-trichloroaniline; dihaloaminodiphenyl ethers such as 2,2'-diamino-4,4'-dichlorodiphenyl ether and 2,4'-diamino-2',4,-dichlorodiphenyl ether, and the above-cited compound in which the amino group is substituted with a thiol group or a hydroxyl group. There is also usable a halogenated aromatic compound containing active hydrogen wherein a hydrogen atom bonded to a carbon atom which forms an aromatic ring in the halogenated aromatic compound is substituted with an other inert group including a hydrocarbon group such as an alkyl group. Of these, dihalogenated aromatic compounds containing active hydrogen are preferable, and dichloroaniline are particularly preferable.

Examples of the above-mentioned polyhalogenated aromatic compound having at least three halogen atoms in one molecule include 1,2,4-trichlorobenzene, 1,3,5-trichlorobenzene and 1,4,6-trichloronaphthalene. Examples of the halogenated aromatic nitro compound include monohalonitrobenzenes such as 2,4-dinitrochlorobenzene; dihalonitrobenzenes such as 2,5-dichloronitrobenzene; dihalonitrodiphenyl ethers such as 2-nitro-4,4'-dichlorodiphenyl ether; dihalonitrodiphenyl sulfones such as 3,3'-dinitro-4,4'-dichlorodiphenyl sulfone; monohalonitropyridines such as 2-chloro-3,5-dinitropyridine; dihalonitropyridines such as 2,5-dichloro-3-nitropyridine; and a variety of dihalonitronaphthalenes. The use of the foregoing halogenated aromatic compound containing active hydrogen, polyhalogenated aromatic compound, halogenated aromatic nitro compound or the like, increases the degree of branching for the polymer to be produced, further increases the molecular weight of the same, and produces gel-forming polymer lowered in melt fluidity, thereby enabling to further improve the properties of the polymer formed by the process according to the present invention. Any of the branching agent may be used alone or in combination with at least one other species, and is used in an amount of usually 0.0005 to 0.05 mol, preferably 0.001 to 0.02 mol per one mol of sulfur atoms in the sulfur source.

Examples of the organic polar solvent include aprotic organic polar solvents such as amide compounds, lactam compounds, urea compounds, organosulfur compounds and cyclic organophosphorus compounds, which can be used as single solvent or a mixed solvent.

The above-mentioned amide compounds among aprotic organic polar solvents are exemplified by
N,N-dimethylform amide; N,N-diethylformamide;
N,N-dimethylacetoamide; N,N-diethylacetoamide;
N,N-dipropylacetoamide; N,N-dimethylbenzoic acid amide, etc.

The aforesaid lactam compounds are exemplified by N-alkyl-caprolactam such as caprolactam;
N-methylcaprolactam; N-ethylcaprolactam;
N-isopropylcaprolactam; N-isobutylcaprolactam;
N-n-propylcaprolactam; N-n-butylcaprolactam; and
N-cyclohexylcaprolactam; N-methyl-2-pyrrolidone(NMP);
N-ethyl-2-pyrrolidone; N-isopropyl-2-pyrrolidone;
N-isobutyl-2-pyrrolidone; N-n-propyl-2-pyrrolidone;
N-n-butyl-2-pyrrolidone; N-cyclohexyl-2-pyrrolidone;
N-methyl-3-methyl-2-pyrrolidone;
N-ethyl-3-methyl-2-pyrrolidone;
N-methyl-3,4,5-trimethyl-2-pyrrolidone;
N-methyl-2-piperidone; N-ethyl-2-piperilidone;
N-isopropyl-2-piperidone; N-methyl-6-methyl-2-piperidone;
N-methyl-3-ethyl-2-piperidone, etc.

The aforesaid urea compounds are exemplified by tetramethylurea; N,N'-dimethylethyleneurea;
N,N'-dimethylpropyleneurea, etc.

The aforesaid organosulfur compounds are exemplified by
dimethylsulfoxide; diethylsulfoxide; diphenylsulfone;
1-methyl-1-oxosulfolane; 1-ethyl-1-oxosulfolane;
1-phenyl-1-oxosulfolane etc.

The aforesaid cyclic organophosphorus compounds are exemplified by 1-methyl-1-oxophosfolane;
1-n-propyl-1-oxophosfolane; 1-phenyl-1-oxophosfolane, etc.

Any of the above-exemplified aprotic organic polar solvent can be used alone or by mixing with at least one other or by mixing with a solvent which is not cited above and does not impair the object of the present invention so as to enable the mixture to be used as the foregoing aprotic organic solvent. Of the various aprotic organic solvents as exemplified above are preferable N-alkylcaprolactam and N-alkylpyrrolidone, among which N-methyl-2-pyrrolidone (NMP) is particularly preferable. The amount of the organic polar solvent to be used is usually one to 30 mol, preferably 3 to 15 mol per one mol of sulfur atoms in the sulfur source.

The polymerization reaction for making PAS may be conducted by single stage reaction at 230 to 290° C., preferably 240 to 280° C., more preferably 250 to 270° C. Preferably, the polymerization condensation reaction is preceded by preliminary polymerization at 180 to 230° C., preferably 190 to 220° C., more preferably 195 to 215° C. The polymerization condensation reaction time is 0.5 to 10 hours, preferably 1.0 to 10 hours, more preferably 1.5 to 10 hours.

The first aspect of the present invention is characterized by using the baffles that are asymmetrically arranged in a polymerization vessel, and/or in the form of round bar, in the case of producing PAS by using a polymerization vessel equipped with baffles.

By the term "baffles that are asymmetrically arranged" as mentioned herein is meant to include both the baffles that are placed in an asymmetrical position with respect to the center axis or a plane containing the aforesaid center axis and the baffles that, although being placed in a symmetrical position, are asymmetrical in shape and/or size. As the aforesaid baffles that are placed in an asymmetrical position, there are usable baffles having any shape including same shape and different shape, provided that each of a plurality of baffles is placed in an asymmetrical position on the wall surface of a polymerization vessel. There are particularly preferably usable in the present invention, the baffles wherein not every one is arranged at an equal interval along the wall surface of a polymerization vessel and the baffles, though arranged at an equal interval, but in which at least one baffle is lacking. There are also usable as the baffles that, though being placed in a symmetrical position, are asymmetrical in shape and/or size, the baffles that are placed in symmetrical position and have each a different length. For instance, there are preferably usable the baffles in which either baffle has a length of at least 1.2 times, preferably at least 2 times that of the other baffle. Preferably in this case, as is usually employed, the longer baffle has such a length that the lower end thereof is located on the upper position of the end plate of a polymerization vessel. By the term "baffle length" is meant the length of a baffle which is situated beneath the polymerization liquid level in a polymerization vessel, and which acts upon agitation effectively.

As the baffles that, although being placed in a symmetrical position, are asymmetrical in shape and/or size, there are usable baffles that are placed in a symmetrical position and have each a different width. In particular, there are preferably usable the baffles in which either baffle has a width of at least 1.2 times, preferably at least 3 times that of the other baffle. Usually, the baffle width is at most 10%, especially 3 to 7% of the inside diameter of a polymerization vessel. The shape of baffles is not specifically limited, but plate-like and bar-like baffles are usable.

Figure 1:
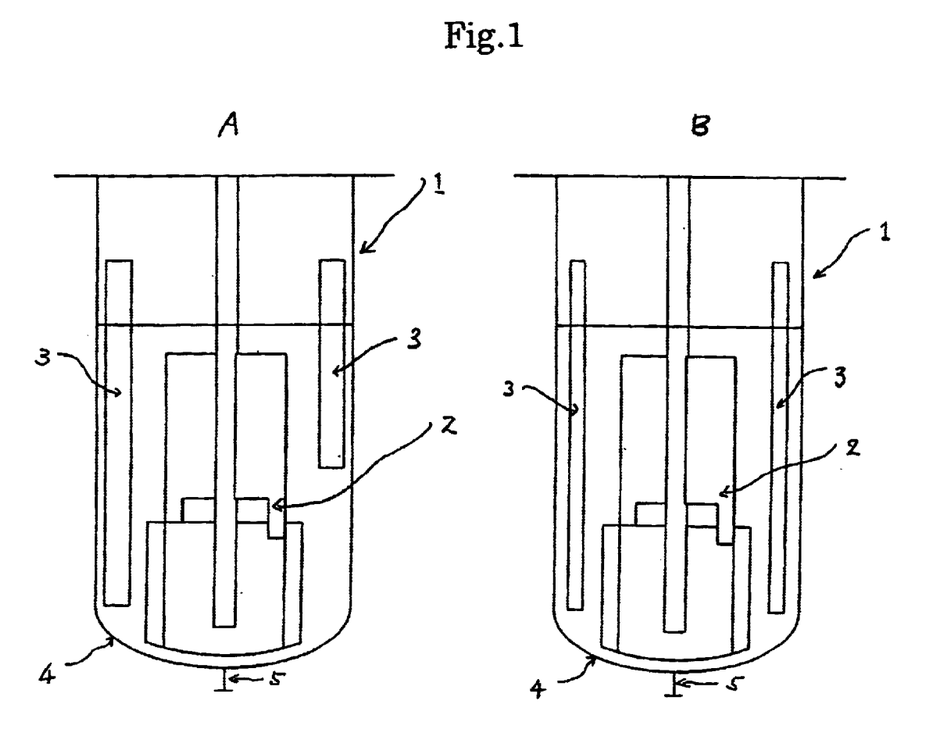
FIGS. 1, 2, 3 and 6 are each schematic cross-sectional view showing one example of production apparatus according to the present invention.

The diameter of the baffles in the form of round bar is preferably at most 10%, especially 3 to 7% of the inside diameter of a polymerization vessel. When the diameter thereof departs from the foregoing range, polymer phase dispersibility is often deteriorated. The baffles in the form of round bar are not specifically limited in length, arrangement and the like, but may be in an asymmetrical arrangement such as the foregoing. FIG. 1 is a schematic cross-sectional view showing one example of the production apparatus according to the present invention. FIGS. 1A and B are each one example of polymerization apparatus equipped with baffles that are asymmetrically arranged and/or in the form of round bar, of which FIG. 1A is an example of apparatus equipped with baffles that are asymmetrically arranged, while FIG. 1B is an example of apparatus equipped with baffles that are in the form of round bar.

The materials of construction for the aforesaid baffles are not specifically limited. For instance, SUS 316L or the like is usable.

According to FIG. 1, a polymerization vessel 1 which is fitted with an agitational blade 2 and baffles 3 is equipped with a withdrawing portion 5 on an end plate 4. In the polymerization vessel 1 which is fitted with the foregoing specific baffles 3 in the present invention, the sulfur source and dihalogenated aromatic compound are subjected to polymerization condensation in an organic polar solvent in the presence when necessary, of a phase separation agent, while agitating with the agitation blade 2, the reaction product is separated into the polymer phase and the solvent phase, the polymer phase settled in the lower portion of the polymerization vessel owing to the difference in specific gravity is taken out through the withdrawing portion 5 located on the bottom end plate of the vessel so that the polymer phase is prevented from agglomerating.

In the process and apparatus according to the first aspect of the present invention, examples of agitational blades capable of being preferably combined with the foregoing baffles include anchor blade, screw blade, maxblend blade, large size paddle blade, full zone blade and the like which are called uniaxial large size slab blade, of which full zone blade is preferable from the objects of the present invention.

The second aspect of the present invention is characterized by using the agitational blade which is devoid of a notch in the vicinity of the tip portion thereof, and which is in such a form as substantially equalizing the spacing between the tip portion thereof and the opposite bottom portion and/or end portion of a polymerization vessel all over the aforesaid tip portion, in the case of producing PAS by using a polymerization vessel equipped with baffles.

There has heretofore been employed in producing PAS, an agitational blade which has usually a notch in the vicinity of the central portion thereof, and with which the polymer phase settled in the bottom of the vessel is curled up and agitated. However according to such blade, the curled up polymer phase stagnates in the notched portion, and often causes incapability of assuring sufficient agitation and PAS having a high molecular weight. Hence in the present invention, polymerization reaction is conducted by using an agitational blade devoid of a notch in the vicinity of the tip portion.

The shape of the agitational blade devoid of a notch in the vicinity of the tip portion is not specifically limited provided that the blade is devoid of a notch in the vicinity of the tip portion. There is usually usable any of the agitational blades that are employed in polymerization reaction and devoid of a notch. Examples of such agitational blade include large size notch-free agitational blade such as anchor blade, screw blade, maxblend blade, large size paddle blade, full zone blade and the like which are called uniaxial large size slab blade without a notch, of which full zone blade is preferable from the objects of the present invention.

In regard to the second aspect of the present invention, polymerization is effected by using the agitational blade as prescribed above in such a manner as substantially equalizing the spacing between the tip portion thereof and the opposite bottom portion and/or end portion of a polymerization vessel all over the aforesaid tip portion. The end portion as mentioned herein means a plate such as a dished plate which constitutes an end of cylindrical portion in a polymerization vessel. The tip portion of the agitational blade means the portion wherein the tip of the agitational blade or the lower end edge portion thereof is in opposition to the foregoing bottom portion and/or end portion of a polymerization vessel. It is preferable in the second aspect of the present invention that the spacing between the tip portion of the agitational blade or the lower end edge portion thereof and the opposite bottom portion and/or end portion of the vessel be substantially equalized, that is, being equally spaced out all over the aforesaid tip portion or the edge portion.

The spacing between the tip portion of the agitational blade or the lower end edge portion thereof and the opposite bottom portion and/or end portion of the polymerization vessel is properly optionally selected according to the production scale without specific limitation. Preferably, the foregoing spacing is at most 10% of the inside diameter of the vessel, especially ranges from 2 to 5% thereof in order to maintain a favorable agitational state. The substantially equalized spacing therebetween as stated herein means to include a variance being ±1% for the inside diameter of the vessel in regard to the average spacing between the tip portion of the agitational blade or the lower end edge portion thereof and the opposite bottom portion and/or end portion of the polymerization vessel.

Figure 2:
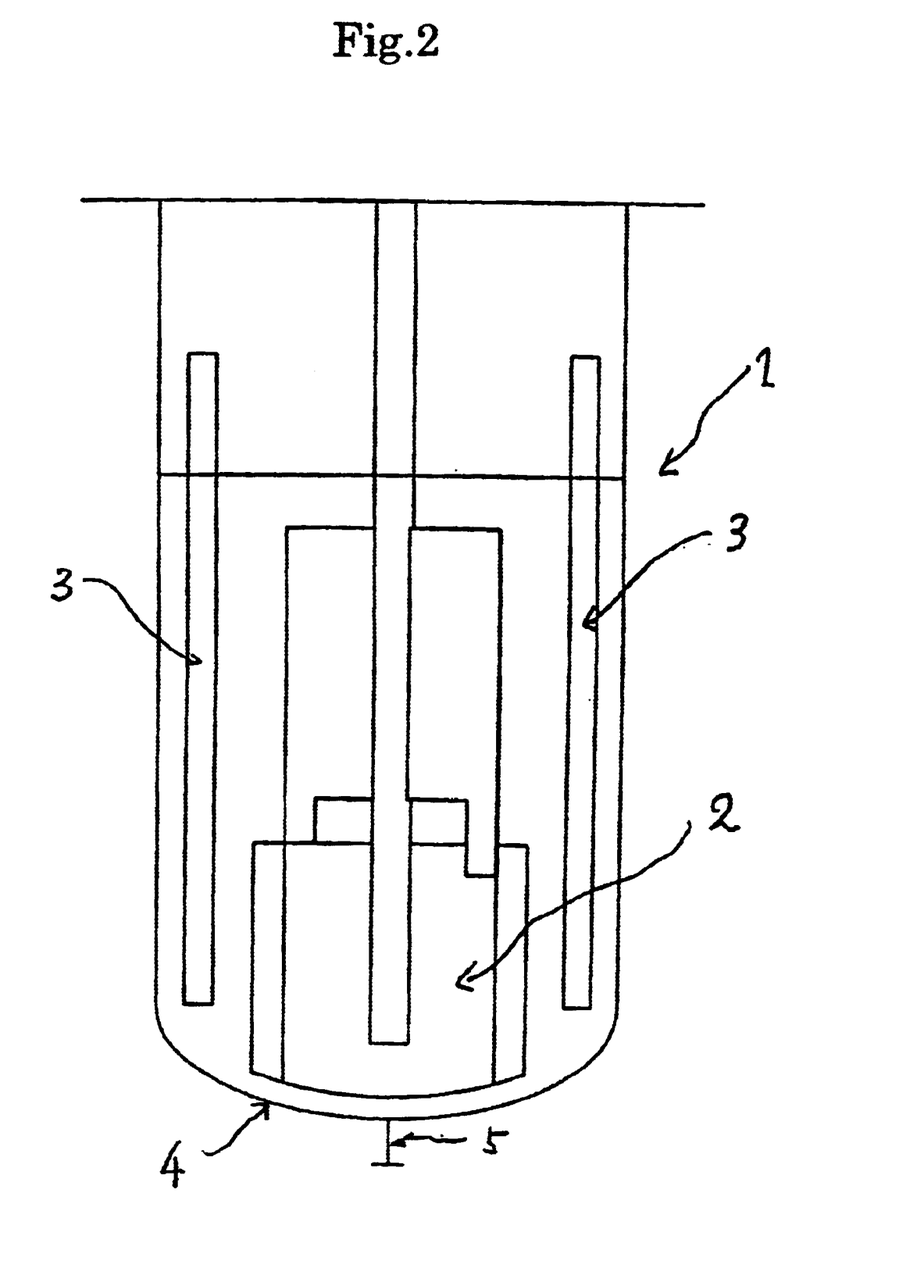
Figure 3:
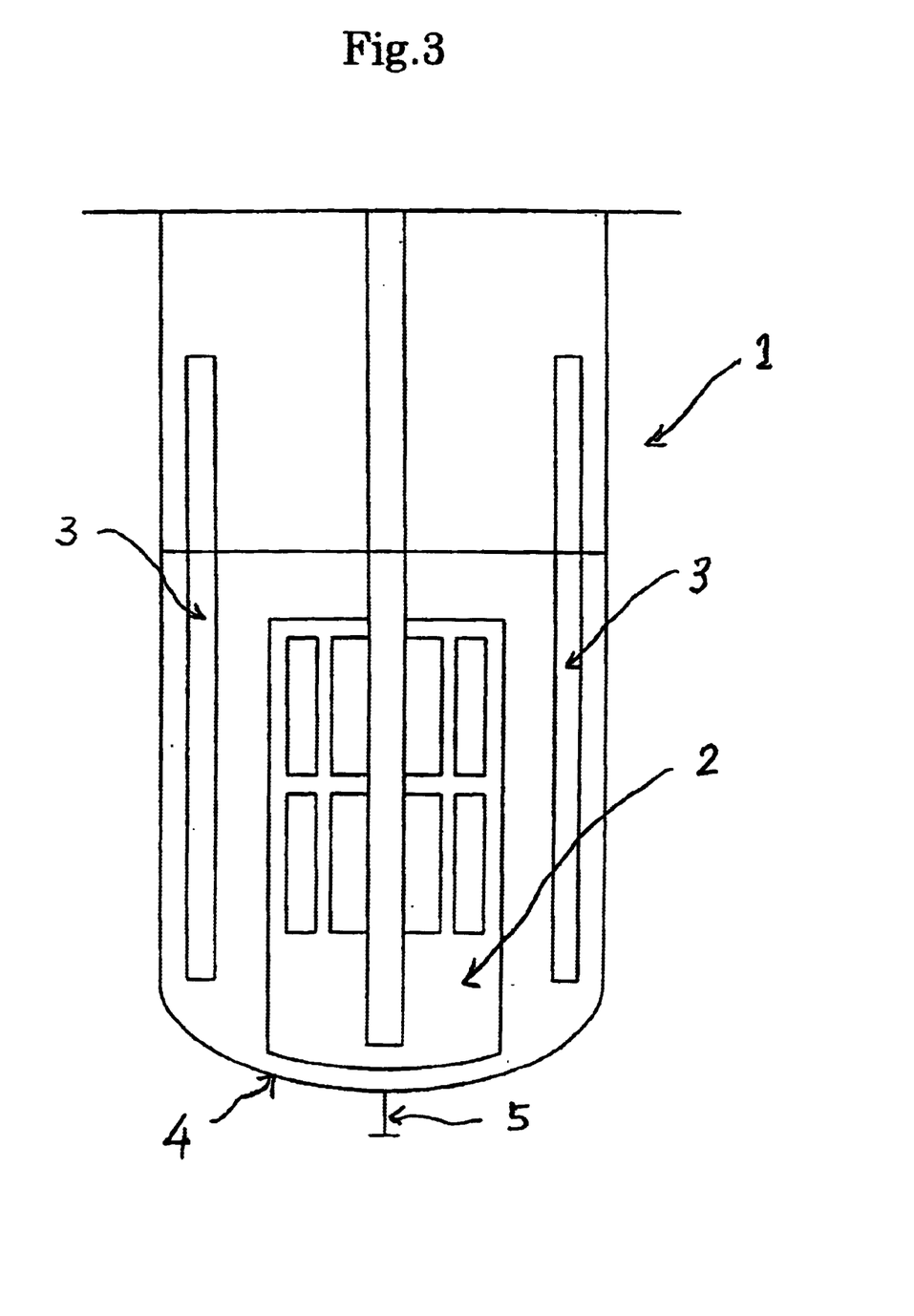

FIGS. 2 and 3 are each a schematic cross-sectional view showing one example of the PAS production apparatus according to the second aspect of the present invention. Specifically, FIGS. 2 and 3 each illustrate the PAS production apparatus equipped with an agitational blade without a notch and such configuration that the spacing between the tip portion of the agitational blade or the lower end edge portion thereof and the opposite bottom portion and/or end portion of the vessel is substantially equalized all over the tip portion or the edge portion. FIG. 2 shows an example of full zone blade without a notch, while FIG. 3 shows an example of maxblend blade without a notch.

According to each of FIGS. 2 and 3, a polymerization vessel 1 which is fitted with an agitational blade without a notch 2 and baffles 3 is equipped with a withdrawing portion 5 on an end plate 4. In the polymerization vessel 1 which is fitted with the agitational blade 2 in the present invention, the sulfur source and dihalogenated aromatic compound are subjected to polymerization condensation in an organic polar solvent in the presence when necessary, of a phase separation agent, while agitating with the agitation blade 2, the reaction product is separated into the polymer phase and the solvent phase, the polymer phase settled in the lower portion of the polymerization vessel owing to the difference in specific gravity is taken out through the withdrawing portion 5 located on the bottom end plate 4 of the vessel so that the polymer phase is prevented from agglomerating.

In order to effectively achieve the objects of the present invention, there are preferably used a process and an apparatus that are constituted of the combination of the first and second aspects of the present invention. That is to say, there are preferably used a process and an apparatus for carrying out polymerization by using the baffles that are asymmetrically arranged in a polymerization vessel, and/or in the form of round bar as the first aspect of the present invention, and also by using the agitational blade which is devoid of a notch in the vicinity of the tip portion thereof, and which is in such a form as substantially equalizing the spacing between the tip portion thereof and the opposite bottom portion and/or end portion of a polymerization vessel all over the aforesaid tip portion as the second aspect of the present invention.

The production process according to the third aspect of the present invention is characterized by withdrawing the polymer phase through a withdrawing portion provided on the end plate of the aforesaid polymerization vessel in the case of producing a PAS by polymerization in a polymerization vessel and then separating it into the polymer phase and the solvent phase.

The end portion as mentioned herein means a plate such as a dished plate which constitutes an end of cylindrical portion in a polymerization vessel. In the process or an apparatus according to the third aspect of the present invention, the position of the polymer phase withdrawing portion is not specifically limited, provided that the aforesaid withdrawing portion is placed on the end plate of the polymerization vessel. The withdrawing portion, however, is preferably located at the bottom portion, in particular utmost bottom portion of the polymerization vessel from the viewpoint of the working effect. By installing the polymer phase withdrawing portion on the end plate of the vessel in this manner, it is made possible to immediately take out at least part of the polymer phase settled in the lower portion of the polymerization vessel, and thereby prevent the polymer phase from agglomerating.

Figure 6:
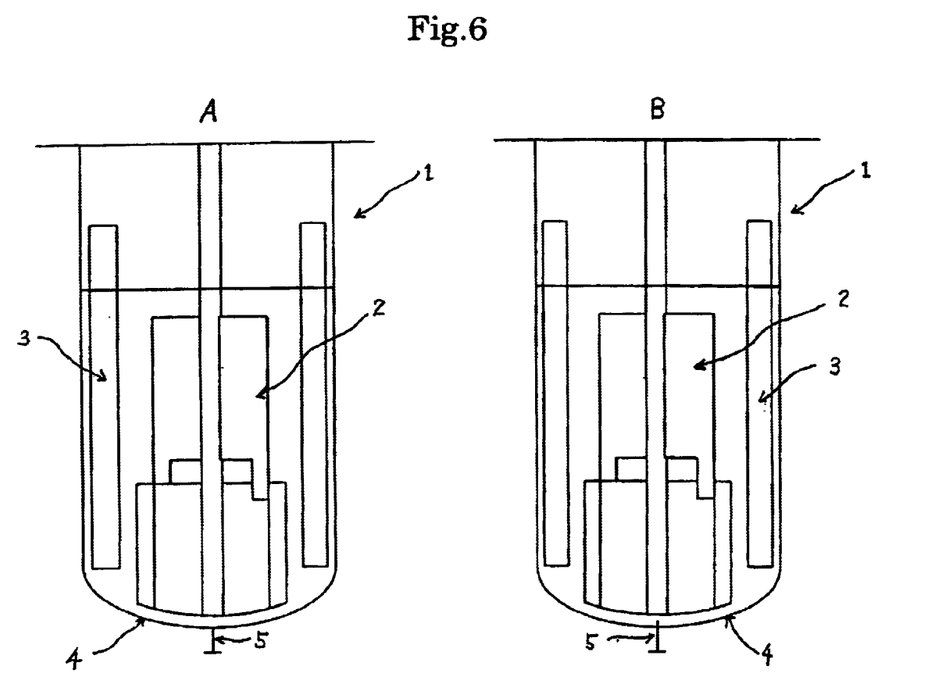

FIG. 6 is a schematic cross-sectional view showing one example of the production apparatus according to the present invention. FIG. 6A and B are each one example of polymerization apparatus equipped at the bottom portion with a withdrawing portion, of which FIG. 1B is an example of a withdrawing portion protruding into the inside of the polymerization vessel.

According to FIG. 6, a polymerization vessel 1 which is fitted with an agitational blade without a notch 2 and baffles 3 is equipped with a withdrawing portion 5 on an end plate 4. In the process or apparatus according to the third aspect of the present invention, a withdrawing portion is preferably of the form of protruding from the end plate 4 at the bottom of the polymerization vessel into the vessel, and is particularly preferably of the form of protruding from the end plate 4 at the bottom of the vessel thereinto by a protrusive length of at most 80% of the spacing between the tip portion of the agitational blade and the opposite bottom portion. Such configuration is markedly favorable from the aspect of assuring a high molecular weight of PAS, since it enables to prevent the polymer phase from agglomerating and at the same time, facilitates to control the compositional ratio of the polymer phase to the solvent phase. The foregoing protrusive length, when exceeding 80% of the spacing, often brings about such constructional disadvantage that a withdrawing portion comes in contact with the agitational blade and so forth. Taking into consideration the foregoing, it is particularly preferable that the position of the withdrawing port is located in the range of 50 to 70% of the spacing between the tip portion of the agitation blade and the opposite bottom portion of the vessel.

The shape, size, material of construction and the like of the aforesaid withdrawing portion except for the foregoing are not specifically limited, but may be properly optionally determined from the production scale, specification of the agitator and the like factors in the production of PAS. For instance, marketed steel pipe is usable therefor.

In the above-mentioned polymerization vessel 1, the sulfur source and dihalogenated aromatic compound are subjected to polymerization condensation in an organic polar solvent in the presence when necessary, of a phase separation agent, while agitating with the agitational blade 2, the reaction product is separated into the polymer phase and the solvent phase, and the polymer phase settled in the lower portion of the polymerization vessel owing to the difference in specific gravity is taken out through the withdrawing portion 5 located on the bottom end plate of the vessel so that the polymer phase is prevented from agglomerating.

The third aspect of the present invention can be put into practice by combining with the first and/or the second aspects of the present invention, whereupon further excellent working effect can be exhibited.

In the polymerization vessel to be used for producing PAS according to each of the aspects of the present invention, the agitation power Pv is preferably 0.025 to 0.3 kW/m$^3$. The use of the baffles, agitational blade and withdrawing portion in the Pv range enables to assure a favorable dispersion state of the polymer phase.

According to the present invention, it is made possible to provide a process for producing PAS which process is capable of forming a uniform dispersion state of a polymer phase in a PAS polymerization vessel, controlling the compositional ratio of the polymer phase to the solvent phase with high accuracy and high precision and besides, producing PAS with a high molecular weight; and also to provide an apparatus for producing PAS which apparatus is capable, with simple convenient specification, of forming a uniform dispersion state of a polymer phase, and controlling the compositional ratio of the polymer phase to the solvent phase with high accuracy and high precision.

In what follows, the present invention will be described in more detail with reference to comparative examples and working examples, which however shall never limit the present invention thereto.

EXAMPLE 1

Preparatory Polymerization

A one m$^3$ titanium-made starting material synthesis vessel (reactor) equipped with an agitator was charged with 554 kg of N-methyl-2-pyrrolidone (NMP) and 100 kg (2.38 kilomol) of lithium hydroxide (LiOH·H$_2$O), and the resultant mixture was heated to and kept at 140° C. The water contained in the lithium hydroxide as a starting material was removed by batch distillation. Then, 65 n kiloliter (kL) of gaseous hydrogen sulfide was blown into the mixture at a temperature kept at 130° C. to synthesize lithium hydrosulfide.

Subsequently, blowing of hydrogen sulfide was stopped, and the reactor was again heated to raise the temperature up to 205° C. Accompanying the temperature rise, the water by-produced on blowing hydrogen sulfide was removed by batch distillation, while lithium sulfide was produced from lithium hydrosulfide.

After the completion of the reaction, the reaction product contained 1.08 kilomol of lithium sulfide and 0.214 kilomol of lithium n-methylbutyrate. To the reaction product was added 165.1 kg (1.123 kilomol) of p-dichlorobenzene (PDCB) and further 5.83 kg (0.32 kilomol) of pure water to proceed with reaction at 210° C. for 3 hours. Then the reaction liquid was allowed to cool to 60° C. or lower, and the resultant reaction mixture was taken out from the reactor into a 20 liter vessel. The conversion of the PDCB was 85%.

Continuous Substantial Polymerization

Substantial polymerization was conducted by the use of a polymerization vessel as illustrated on FIG. 1A. The vessel was in the form of 10 liter autoclave and was equipped with a withdrawing line having an inside diameter of 4 mm in the middle of the end plate bottom; a plate-like baffle having a width of 10 mm and a length from a liquid level to the end plate being 234 mm, a plate-like baffle having a width of 10 mm and a length under the liquid level being 117 mm (length of 0.5 times that of the former) so that the aforesaid baffles on the wall surface were opposed to each other; a liquid level meter; and an agitational blade fitted with a full zone blade (the spacing between the tip of the full zone blade and the bottom of the vessel was made to be 10 mm). Thus, the autoclave was charged with 855 g of lithium chloride as a phase separation agent and 5145 g of NMP, and was heated to raise the temperature up to 260° C. The prepolymer obtained in the foregoing preparatory polymerization was preserved at 60° C. and was continuously supplied to the autoclave at a flow rate of 45 g/minute by using a gear pump, while the agitational blade was driven at 150 rpm with an agitational power of 0.2 kW/m$^3$.

On the other hand, the polymer phase thus prepared was continuously withdrawn through the withdrawing line in the middle of the end plate bottom so as to maintain a constant liquid level by controlling the level with the liquid level meter and a valve installed on the withdrawing line. The liquid (dispersion of polymer phase in solvent phase) withdrawn through a sampling line located in the middle of the liquid column was allowed to cool. Thereafter, an observation was made of the dispersion state of the polymer phase with a microscope. As a result, spherical polymer was observed, thus proving a favorable dispersion state thereof in the polymerization vessel.

In addition, the resultant polymer phase was cleaned with a large amount of hot water, dried, and thereafter dissolved in a α-chloronaphthalene so as to attain a concentration of 0.4 dL (deciliter)/g. The intrinsic viscosity was measured at 206° C. by using a Ubbellohde viscometer. As a result, the intrinsic viscosity was as high as 0.29, thus proving that PPS having a high molecular weight was obtained.

EXAMPLE 2

The procedure in Example 1was repeated to carry out polymerization except that use was made of a continuous polymerization vessel as illustrated on FIG. 1B, specifically use was made of baffles in the from of round bar having a diameter of 12 mm in place of the baffles as used in Example 1, and the agitational blade was driven at 165 rpm with an agitational power of 0.2 kW /m$^3$. As a result of observation for the dispersion state of the polymer phase in the same manner, spherical polymer was observed, thus proving a favorable dispersion state thereof in the polymerization vessel. Moreover, the intrinsic viscosity thereof was as high as 0.30, thus proving that PPS having a high molecular weight was obtained.

EXAMPLE 3

Preparatory Polymerization

Preparatory polymerization was carried out in the same manner as in Example 1.

Continuous Substantial Polymerization

Substantial polymerization was conducted by the use of a polymerization vessel as illustrated on FIG. 2. The vessel was in the form of 10 liter autoclave and was equipped with a withdrawing line having an inside diameter of 4 mm in the middle of the end plate bottom; 4 baffles in round bar form each having a diameter of 12 mm and a length from a liquid level to the end plate being 300 mm, so that the aforesaid baffles were opposed to each other at an equal interval; a liquid level meter; and an agitational blade fitted with a full zone blade devoid of a notch (the spacing between the tip of the full zone blade and the bottom of the vessel was made to be 10 mm). Thus, the autoclave was charged with 855 g of lithium chloride as a phase separation agent and 5145 g of NMP, and was heated to raise the temperature up to 260° C. The prepolymer obtained in the foregoing preparatory polymerization was preserved at 60° C. and was continuously supplied to the autoclave at a flow rate of 45 g/minute by using a gear pump, while the agitational blade was driven at 165 rpm with an agitational power of 0.2 kW /m$^3$.

On the other hand, the polymer phase thus prepared was continuously withdrawn through the withdrawing line in the middle of the end plate bottom so as to maintain a constant liquid level by controlling the level with the liquid level meter and a valve installed on the withdrawing line. The liquid (dispersion of polymer phase in solvent phase) withdrawn through a sampling line located in the middle of the liquid column was allowed to cool. Thereafter, an observation was made of the dispersion state of the polymer phase with a microscope. As a result, spherical polymer was observed, thus proving a favorable dispersion state thereof in the polymerization vessel.

In addition, the resultant polymer phase was cleaned with a large amount of hot water, dried, and thereafter dissolved in α-chloronaphthalene so as to attain a concentration of 0.4 dL/g. The intrinsic viscosity was measured at 206° C. by using a Ubbellohde viscometer. As a result, the intrinsic viscosity was as high as 0.30, thus proving that PPS having a high molecular weight was obtained.

COMPARATIVE EXAMPLE 1

Figure 4:
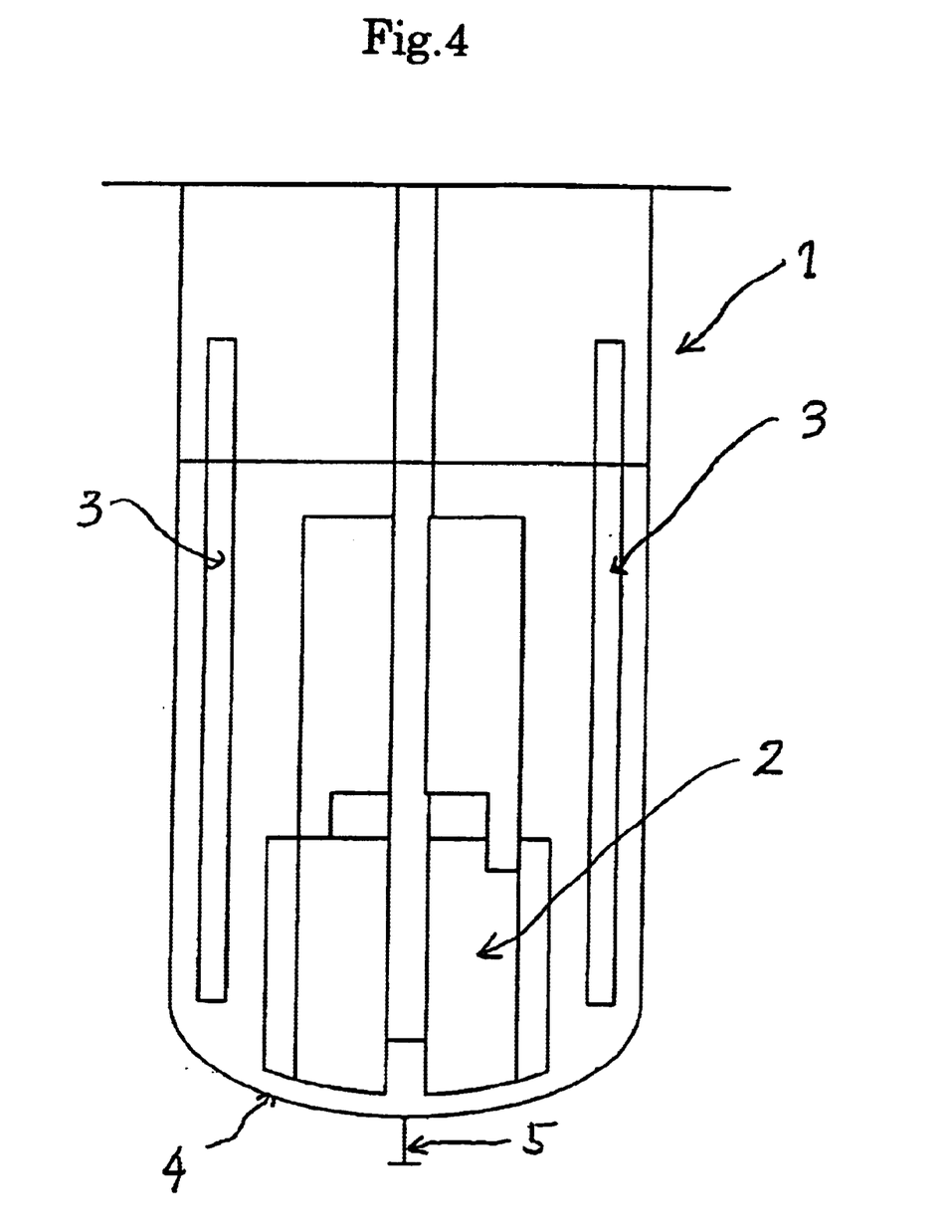
FIGS. 4, 5, and 7 are each schematic cross-sectional view showing one example of production apparatus outside the scope of the present invention.

The procedure in Example 3was repeated to carry out polymerization except that use was made of a continuous polymerization vessel as illustrated on FIG. 4, specifically use was made of an agitational blade with a notch having a width of 16 mm and a depth of 24 mm in place of the agitational blade as used in Example 3.

As a result of observation for the dispersion state of the polymer phase in the same manner as in Example 3, although the intrinsic viscosity thereof was as high as 0.30, thus proving that PPS having a high molecular weight was obtained, amorphous polymer was observed, thus proving an unfavorable dispersion state thereof in the polymerization vessel.

EXAMPLE 4

The procedure in Example 3 was repeated to carry out polymerization except that use was made of a continuous polymerization vessel as illustrated on FIG. 3, specifically use was made of an agitational blade of maxblend type without any notch in place of the agitational blade as used in Example 3, and the supply flow rate was set on 39 g/minute instead of 45 g/minute.

As a result of observation for the dispersion state of the polymer phase in the same manner, spherical polymer was observed, thus proving a favorable dispersion state thereof in the polymerization vessel. Moreover, the intrinsic viscosity thereof was as high as 0.29, thus proving that PPS having a high molecular weight was obtained.

COMPARATIVE EXAMPLE 2

Figure 5:
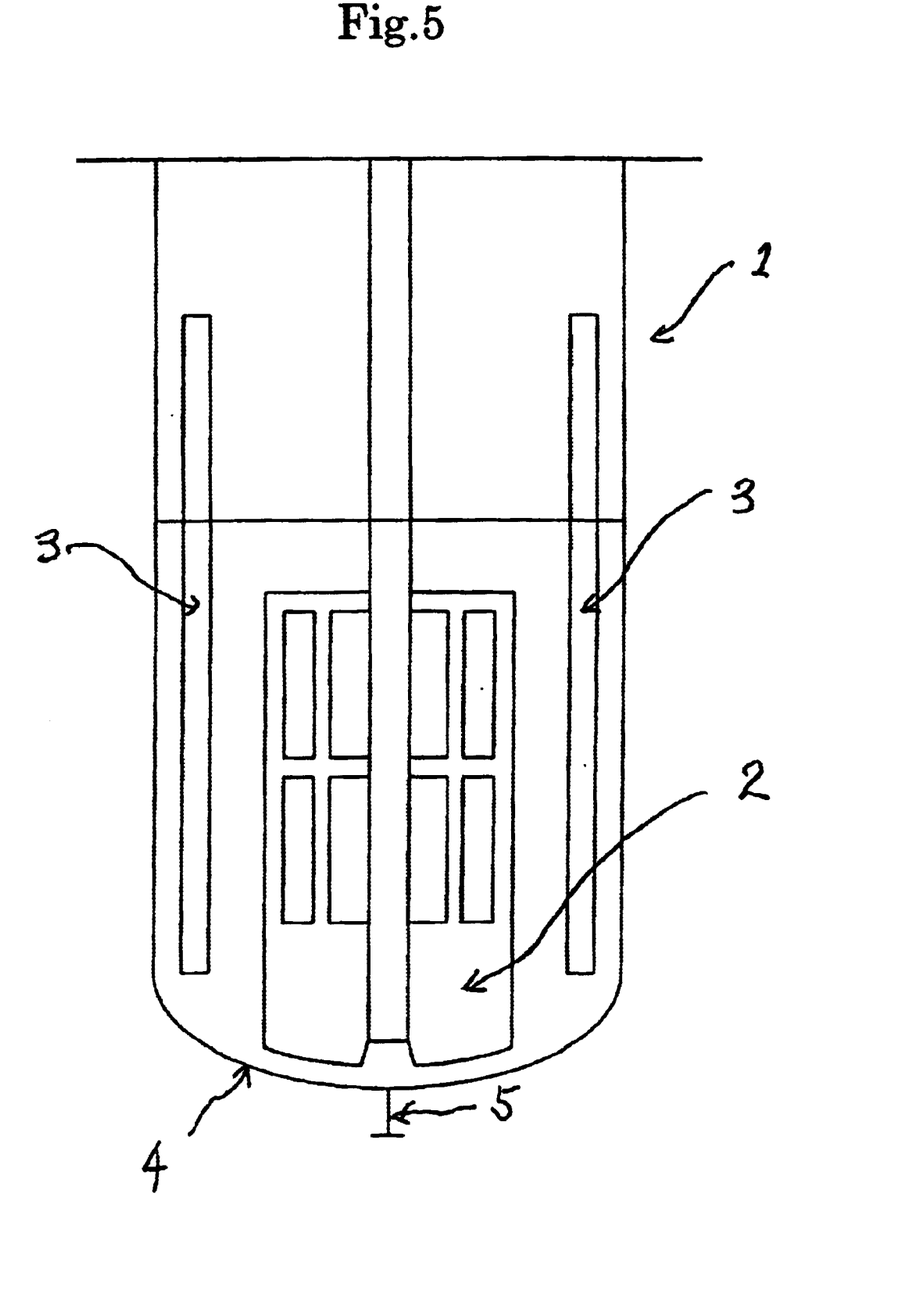

The procedure in Example 4 was repeated to carry out polymerization except that use was made of a continuous polymerization vessel as illustrated on FIG. 5, specifically use was made of an agitational blade with a notch having a lower end width of 22 mm, an upper end width of 16 mm and a depth of 10 mm in place of the agitational blade as used in Example 4.

As a result of observation for the dispersion state of the polymer phase in the same manner as in Example 3, although the intrinsic viscosity thereof was as high as 0.29, thus proving that PPS having a high molecular weight was obtained, amorphous polymer was observed, thus proving an unfavorable dispersion state thereof in the polymerization vessel.

EXAMPLE 5

Preparatory Polymerization

Preparatory polymerization was carried out in the same manner as in Example 1.

Continuous Substantial Polymerization

Substantial polymerization was conducted by the use of a polymerization vessel as illustrated on FIG. 6A. The vessel was in the form of 10 liter autoclave and was equipped with a withdrawing line having an inside diameter of 4 mm in the middle of the end plate bottom; baffles in round bar form; a liquid level meter; and an agitational blade fitted with a full zone blade (the spacing between the tip of the full zone blade and the bottom of the vessel was made to be 10 mm). Thus, the autoclave was charged with 855 g of lithium chloride as a phase separation agent and 5145 g of NMP, and was heated to raise the temperature up to 260° C. The prepolymer obtained in the foregoing preparatory polymerization was preserved at 60° C. and was continuously supplied to the autoclave at a flow rate of 45 g/minute by using a gear pump, while the agitational blade was driven at 140 rpm with an agitational power of 0.2 kW/m³.

On the other hand, the polymer phase thus prepared was continuously withdrawn through the withdrawing line in the middle of the end plate bottom so as to maintain a constant liquid level by controlling the level with the liquid level meter and a valve installed on the withdrawing line. The liquid (dispersion of polymer phase in solvent phase) withdrawn through a sampling line located in the middle of the liquid column was allowed to cool. Thereafter, an observation was made of the dispersion state of the polymer phase with a microscope. As a result, spherical polymer was observed, thus proving a favorable dispersion state thereof in the polymerization vessel.

EXAMPLE 6

The procedure in Example 5 was repeated to carry out polymerization except that use was made of a continuous polymerization vessel as illustrated on FIG. 6B, specifically the tip of the withdrawing line (withdrawing port) was protruded from the bottom of the end plate into the inside of the vessel by a protrusion length of 5 mm.

As a result of observation for the dispersion state of the polymer phase in the same manner, spherical polymer was observed, thus proving a favorable dispersion state thereof in the polymerization vessel.

REFERENCE EXAMPLE 1

Figure 7:
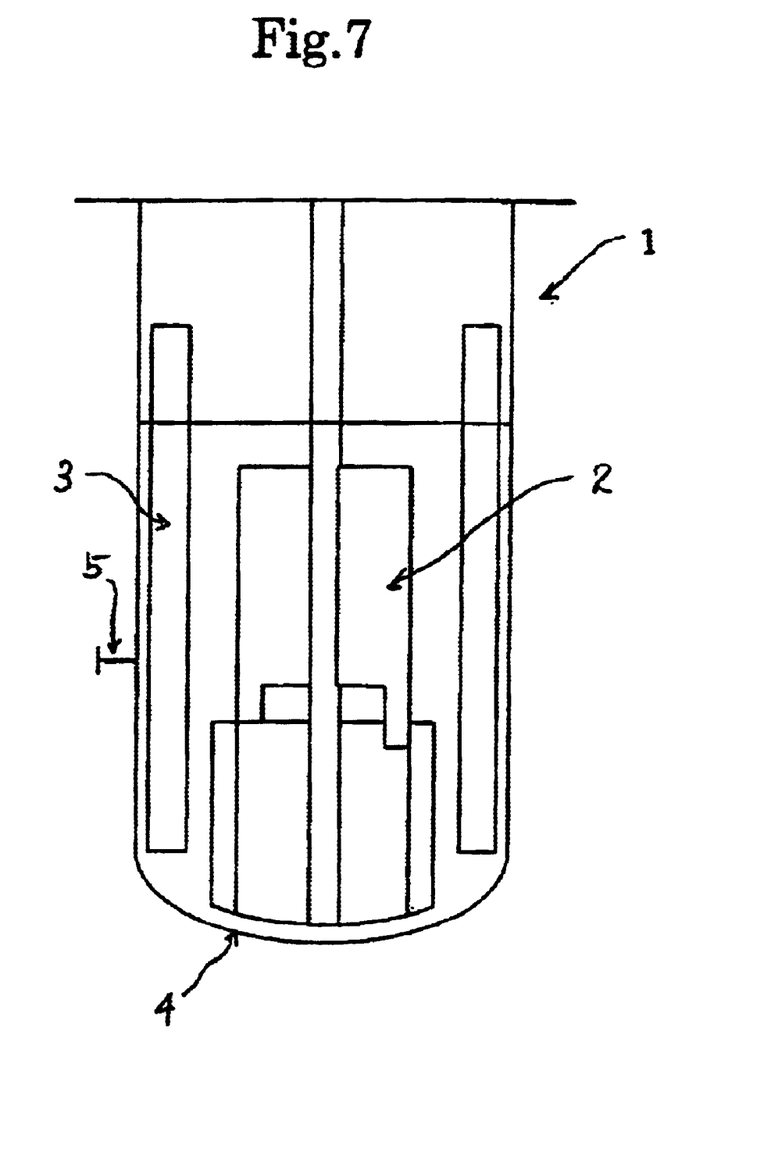

The procedure in Example 5 was repeated to carry out polymerization except that use was made of a continuous polymerization vessel as illustrated on FIG. 7, specifically the withdrawing line was located at a position 100 mm higher than the lower tangent line.

As a result of observation for the dispersion state of the polymer phase in the same manner as in Example 5, amorphous polymer was observed, thus proving an unfavorable dispersion state thereof in the polymerization vessel.

What is claimed is:

1. A process for producing a polyarylene sulfide by the use of a polymerization vessel equipped with baffles, wherein use is made of at least one type of baffle selected from baffles that are asymmetrically arranged in a polymerization vessel and baffles in the form of round bar.

2. The process according to claim 1, wherein a plurality of baffles are installed each at an equal interval along the internal wall surface of the polymerization vessel in such configuration as being devoid of at least one baffle.

3. The process according to claim 1, wherein the asymmetrically arranged baffles are located each in a symmetrical or an asymmetrical position, and either baffle has a length of at least 1.2 times the length of other baffle.

4. The process according to claim 1, wherein the asymmetrically arranged baffles are located each in a symmetrical or an asymmetrical position, and either baffle has a width of at least 1.2 times the width of other baffle.

5. The process according to claim 1, wherein the baffles in the form of round bar have each a diameter of at most 10% of the inside diameter of the polymerization vessel.

6. The process according to claim 1, wherein the polymerization vessel is further equipped with an agitational blade which is devoid of a notch in the vicinity of the tip portion thereof, and is in such a configuration as substantially equalizing the spacing between said tip portion thereof and the opposite bottom portion or end portion of the polymerization vessel all over said tip portion thereof.

7. An apparatus for producing a polyarylene sulfide by the use of a polymerization vessel equipped with baffles, wherein use is made of at least one type of baffle selected from baffles that are asymmetrically arranged in a polymerization vessel and baffles in the form of round bar.

8. A process for producing a polyarylene sulfide by the use of a polymerization vessel equipped with an agitational blade, wherein use is made of the agitation blade which is devoid of a notch in the vicinity of the tip portion thereof, and which is in such a configuration as substantially equalizing the spacing between said tip portion thereof and the opposite bottom portion and/or end portion of the polymerization vessel all over said tip portion thereof.

9. The process according to claim 8, wherein the agitational blade is selected from an anchor blade, a screw blade, a maxblend blade, a large size paddle blade and a full zone blade.

10. An apparatus for producing a polyarylene sulfide by the use of a polymerization vessel equipped with an agitational blade, wherein use is made of the agitation blade which is devoid of a notch in the vicinity of the tip portion thereof, and is in such a configuration as substantially equalizing the spacing between said tip portion thereof and the opposite bottom portion and/or end portion of the polymerization vessel all over said tip portion thereof.

11. The process according to claim 1 or 8, wherein the polymer phase is withdrawn through a withdrawing portion provided on the end plate of the polymerization vessel.

12. The process according to claim 11, wherein the withdrawing portion is located at the utmost bottom of the polymerization vessel.

13. The process according to claim 11, wherein the withdrawing portion is protruded from the bottom portion of the polymerization vessel into the inside of said vessel.

14. The apparatus according to claim 7 or 10, wherein the the polymerization vessel is equipped on its end plate with a withdrawing portion which is protruded into the inside of the polymerization vessel by a protrusive length of 0 to 80% of the spacing between the tip portion of the agitation blade and the opposite bottom portion of the vessel.

* * * * *